United States Patent
Lundqvist et al.

(10) Patent No.: US 10,341,929 B2
(45) Date of Patent: Jul. 2, 2019

(54) PSTN / VOIP COMMUNICATION SYSTEM AND METHOD

(71) Applicant: Google Inc., Mountain View, CA (US)

(72) Inventors: Tomas Lundqvist, Segeltorp (SE); Anthony Jawad, Mountain View, CA (US)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 14/154,631

(22) Filed: Jan. 14, 2014

(65) Prior Publication Data

US 2015/0201363 A1    Jul. 16, 2015

(51) Int. Cl.
*H04W 40/12* (2009.01)
*H04W 76/16* (2018.01)
(Continued)

(52) U.S. Cl.
CPC ......... *H04W 40/12* (2013.01); *H04W 76/026* (2013.01); *H04W 76/16* (2018.02);
(Continued)

(58) Field of Classification Search
CPC ..... H04W 36/14; H04W 84/12; H04W 40/12; H04W 40/34; H04W 36/30; H04W 76/026
(Continued)

(56) References Cited

U.S. PATENT DOCUMENTS 6,381,315 B1    4/2002  Nhaissi
7,180,898 B2    2/2007  Yoshida et al.
(Continued)

FOREIGN PATENT DOCUMENTS

EP    1885144 A2    2/2008
EP    2244501 A1   10/2010
(Continued)

OTHER PUBLICATIONS

Ericsson: "RAN—ANDSF Interwor", 3GPP Draft; R2-133440—WLAN 3GPP Radio Interworking—ANDSF Interworking, 3rd Generation Partnership Project (3GPP), vol. RAN WG2, no. Ljubljana, Slovenia; Oct. 7, 2013-Oct. 11, 2013 Sep. 27, 2013 (Sep. 27, 2013), XP050719046, Retrieved from the Internet: URL:http://www.3gpp.org/ftp/tsg_ran/WG2_RL2/TSGR2 83bis/Docs/ [retrieved on Sep. 27, 2013].

(Continued)

*Primary Examiner* — Xavier Szewai Wong
(74) *Attorney, Agent, or Firm* — Faegre Baker Daniels LLP

(57) ABSTRACT

A method and computing system for monitoring a data signal quality level for a wireless client electronic device. The data signal quality level is indicative of the level of data connectivity between the wireless client electronic device and a wireless data network. A cellular signal strength level is monitored for the wireless client electronic device. The cellular signal strength level is indicative of the level of cellular connectivity between the wireless client electronic device and a cellular network. A request for voice communication with the wireless client electronic device is received. If the cellular signal strength level is not sufficient to support the voice communication and the data signal quality level is sufficient to support the voice communication, the voice communication with the wireless client electronic device via the wireless data network is enabled.

18 Claims, 2 Drawing Sheets

(51) Int. Cl.
*H04W 76/02* (2009.01)
*H04W 36/14* (2009.01)
*H04W 36/30* (2009.01)
*H04W 84/12* (2009.01)
*H04W 88/06* (2009.01)
*H04W 92/20* (2009.01)

(52) U.S. Cl.
CPC ............ *H04W 36/14* (2013.01); *H04W 36/30* (2013.01); *H04W 84/12* (2013.01); *H04W 88/06* (2013.01); *H04W 92/20* (2013.01)

(58) Field of Classification Search
USPC ........................................................ 370/221
See application file for complete search history.

(56) References Cited

U.S. PATENT DOCUMENTS

| | | | |
|---|---|---|---|
| 7,433,929 | B2 | 10/2008 | Guilford et al. |
| 7,729,700 | B2 | 6/2010 | Alemany et al. |
| 7,742,498 | B2 | 6/2010 | Barzegar et al. |
| 7,809,360 | B2 | 10/2010 | Agrawal et al. |
| 7,991,399 | B2 | 8/2011 | Ganesan |
| 8,391,192 | B2 | 5/2013 | Prakash et al. |
| 8,484,568 | B2 | 7/2013 | Rados et al. |
| 8,590,023 | B2 | 11/2013 | Gupta et al. |
| 2002/0169716 | A1 | 11/2002 | Johnson et al. |
| 2003/0125023 | A1* | 7/2003 | Fishler .................... H04L 67/04 455/426.1 |
| 2004/0246920 | A1 | 12/2004 | Savolainen |
| 2005/0271011 | A1* | 12/2005 | Alemany et al. ............. 370/331 |
| 2007/0037550 | A1 | 2/2007 | Armstrong |
| 2007/0099613 | A1 | 5/2007 | Burgan et al. |
| 2007/0147317 | A1 | 6/2007 | Smith et al. |
| 2008/0009279 | A1 | 1/2008 | Sakawa |
| 2008/0107051 | A1 | 5/2008 | Chen |
| 2009/0061862 | A1 | 3/2009 | Alberth, Jr. et al. |
| 2009/0298467 | A1 | 12/2009 | Zohar |
| 2010/0304737 | A1 | 12/2010 | Jain et al. |
| 2011/0096673 | A1 | 4/2011 | Stevenson et al. |
| 2011/0151864 | A1* | 6/2011 | Byun .................... H04W 36/30 455/426.1 |
| 2011/0190029 | A1* | 8/2011 | Parssinen ............. H04B 1/0028 455/552.1 |
| 2011/0269476 | A1* | 11/2011 | Kumar .................. H04W 48/18 455/456.1 |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0196644 | A1* | 8/2012 | Scherzer ............... H04W 72/02 455/524 |
| 2012/0282915 | A1 | 11/2012 | Haynes et al. |
| 2013/0040693 | A1 | 2/2013 | Chen et al. |
| 2013/0148567 | A1 | 6/2013 | Efrati et al. |
| 2013/0155842 | A1 | 6/2013 | Moore et al. |
| 2013/0203438 | A1 | 8/2013 | Gupta et al. |
| 2013/0242775 | A1* | 9/2013 | Taylor ................. H04L 65/1006 370/252 |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0261596 | A1 | 9/2016 | Khello et al. |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008/060464 A2 | 5/2008 |
| WO | 2011-162688 A1 | 12/2011 |
| WO | 2014-011094 A1 | 1/2014 |
| WO | 2015158263 A1 | 10/2015 |

OTHER PUBLICATIONS

Ericsson et al: "Analysis of WLAN/3GPP interworking solutions", 3GPP Draft; R2-131388—Analysis of WLAN 3GPP Interworking Solutions, 3rd Generation Partnership Project (3GPP), vol. RAN WG2, no. Chicago,IL, USA; Apr. 15, 2013-Apr. 19, 2013 Apr. 6, 2013 (Apr. 6, 2013), XP050699515, Retrieved from the Internet: URL:http://www.3gpp.org/ftp/tsg_ran/WG2_RL 2/TSGR2 81bis/ Docs/ [retrieved on Apr. 6, 2013].
International Search report and Written Opinion dated Mar. 23, 2015 for PCT/US2015/011085.
Bircher et al., "An Agent-Based Architecture for Service Discovery and Negotiation in Wireless Networks," University of Bern, Wired/ Wireless Internet Comms. (WWIC), Jan. 21, 2004.
Silverman, Dwight, "Thinking of changing cellphone carriers? Check this app first," http://blog.chron.com/techblog/2011/06/ thinking-of-changing-cellphone-carriers-check-this-app-first/, Houston Chronicle Techblog, Jun. 15, 2011.
VoLGA Forum, "VoLGA Stage 2 V1.7.0: Voice over LTE via Generic Access," Jun. 14, 2010.
Qualcomm Europe et al., "Text Proposal for UE Measurements for Minimizing Drive Tests," 3GPP TSG-RAN WG2 Meeting #66, R2-093175, May 4-8, 2009.
Qualcomm Europe, "Framework for UE SON Reports," 3GPP TSG RAN WG3 & SA WG5, S5-090017, Jan. 12-13, 2008.
CMCC, "Network Selection for WLAN/3GPP Radio Interworking," 3GPP TSG-RAN WG2 Meeting 81#bis, R2-130973, Apr. 15-19, 2013.
Levy, Martyn, "Best-Practice Authentication Methods for Wi-Fi Offload," Acurix Networks, May 20, 2013.

* cited by examiner

PSTN / VOIP COMMUNICATION SYSTEM AND METHOD

TECHNICAL FIELD

This disclosure relates to communication systems and, more particularly, to communication systems that may communicate using multiple communication methodologies.

BACKGROUND

Handheld electronic devices may enable wireless voice communication via various communication methodologies. For example, voice communications may be typically made via a PSTN (i.e., Public Switched Telephone Network) communication methodology. Alternatively and if the device is so configured, voice communications may be made via a VoIP (i.e., Voice over IP) communication methodology.

Unfortunately, the transitioning from a first methodology to a second methodology may be complicated and not automated, often resulting in the frustration of the user.

SUMMARY OF DISCLOSURE

In one implementation, a computer-implemented method includes monitoring a data signal quality level for a wireless client electronic device. The data signal strength quality is indicative of the level of data connectivity between the wireless client electronic device and a wireless data network. A cellular signal strength level is monitored for the wireless client electronic device. The cellular signal strength level is indicative of the level of cellular connectivity between the wireless client electronic device and a cellular network. The cellular network is a PSTN network. A request for voice communication with the wireless client electronic device is received. If the cellular signal strength level is not sufficient to support the voice communication and the data signal quality level is sufficient to support the voice communication, voice communication with the wireless client electronic device via the wireless data network is enabled. If the cellular signal strength level is sufficient to support the voice communication, voice communication with the wireless client electronic device via the cellular network is enabled.

In another implementation, a computer-implemented method includes monitoring a data signal quality level for a wireless client electronic device. The data signal quality level is indicative of the level of data connectivity between the wireless client electronic device and a wireless data network. A cellular signal strength level is monitored for the wireless client electronic device. The cellular signal strength level is indicative of the level of cellular connectivity between the wireless client electronic device and a cellular network. A request for voice communication with the wireless client electronic device is received. If the cellular signal strength level is not sufficient to support the voice communication and the data signal quality level is sufficient to support the voice communication, voice communication with the wireless client electronic device via the wireless data network is enabled.

One or more of the following features may be included. Enabling the voice communication with the wireless client electronic device via the wireless data network may include enabling the voice communication with the wireless client electronic device via the wireless data network using VoIP. If the cellular signal strength level is sufficient to support the voice communication, voice communication with the wireless client electronic device via the cellular network may be enabled. The request for voice communication may be from the wireless client electronic device to a second client electronic device. The request for voice communication may concern the wireless client electronic device attempting to call the second client electronic device. The request for voice communication may be from a second client electronic device to the wireless client electronic device. The request for voice communication may concern the second client electronic device attempting to call the wireless client electronic device. The cellular network may be a PSTN network. The wireless data network may be a wifi network. The wireless client electronic device may be a cellular telephone.

In another implementation, a computing system including a processor and memory is configured to perform operations including monitoring a data signal quality level for a wireless client electronic device. The data signal quality level is indicative of the level of data connectivity between the wireless client electronic device and a wireless data network. A cellular signal strength level is monitored for the wireless client electronic device. The cellular signal strength level is indicative of the level of cellular connectivity between the wireless client electronic device and a cellular network. A request for voice communication with the wireless client electronic device is received. If the cellular signal strength level is not sufficient to support the voice communication and the data signal quality level is sufficient to support the voice communication, voice communication with the wireless client electronic device via the wireless data network is enabled.

One or more of the following features may be included. Enabling the voice communication with the wireless client electronic device via the wireless data network may include enabling the voice communication with the wireless client electronic device via the wireless data network using VoIP. If the cellular signal strength level is sufficient to support the voice communication, voice communication with the wireless client electronic device via the cellular network may be enabled. The request for voice communication may be from the wireless client electronic device to a second client electronic device. The request for voice communication may concern the wireless client electronic device attempting to call the second client electronic device. The request for voice communication may be from a second client electronic device to the wireless client electronic device. The request for voice communication may concern the second client electronic device attempting to call the wireless client electronic device. The cellular network may be a PSTN network. The wireless data network may be a wifi network. The wireless client electronic device may be a cellular telephone.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
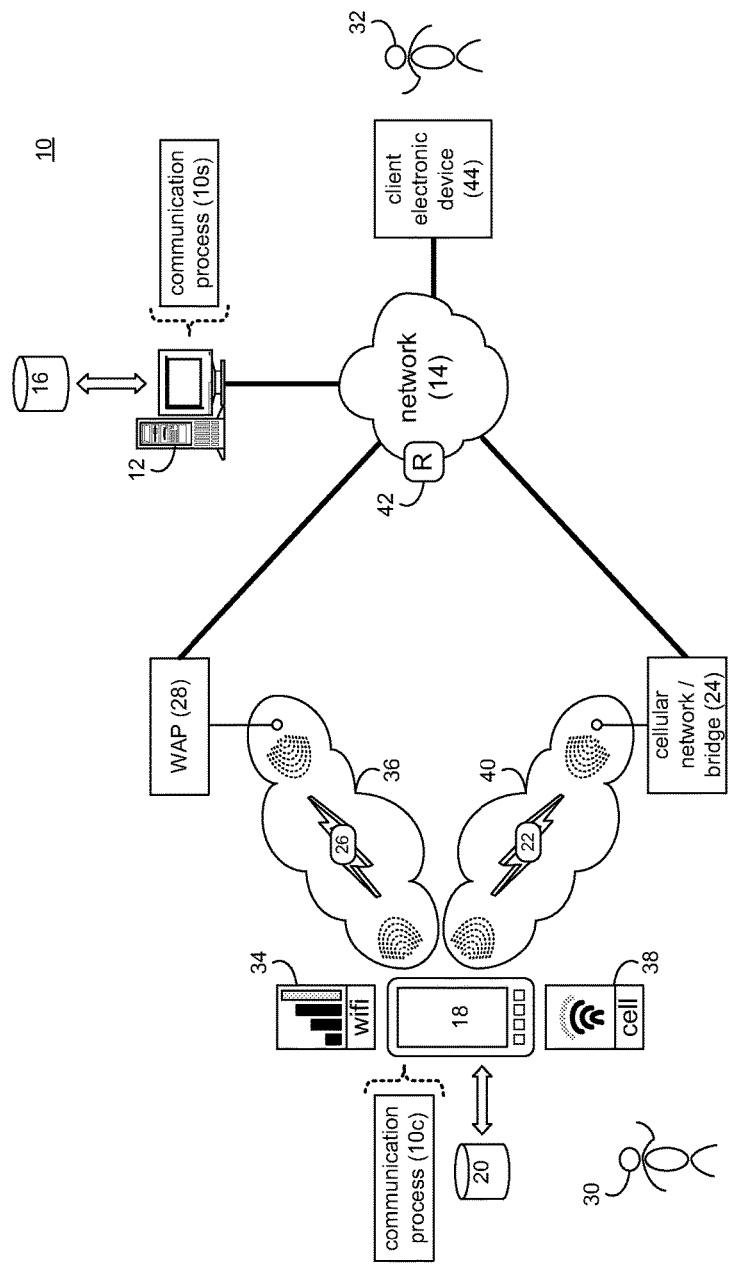
FIG. 1 is a diagrammatic view of a client electronic device that executes a communication process according to an implementation of the present disclosure.
Figure 2:
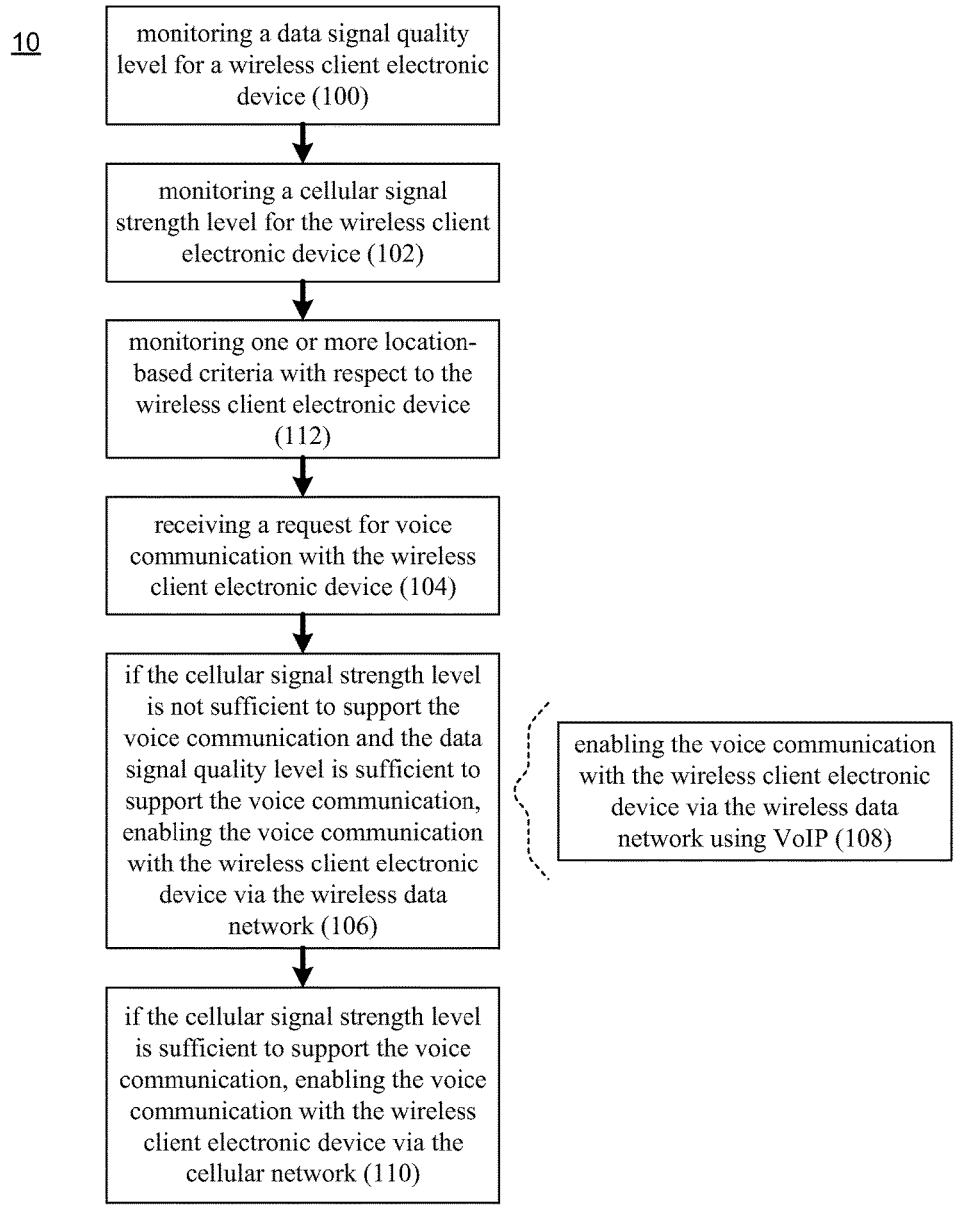
FIG. 2 is a flowchart of the communication process of FIG. 1 according to an implementation of the present disclosure.

In FIGS. 1-2, there is shown communication process 10. Communication process 10 may be implemented as a server-side process, a client-side process, or a hybrid server-side/client-side process. For example, communication process 10 may be implemented as a purely server-side process via communication process 10s. Alternatively, communication process 10 may be implemented as a purely client-side process via communication process 10c. Alternatively still, communication process 10 may be implemented as a hybrid server-side/client-side process via communication process 10s in combination with communication process 10c. Accordingly, communication process 10 as used in this disclosure may include communication process 10s, communication process 10c or the combination of communication process 10s and communication process 10c.

As will be discussed below in greater detail, communication process 10 may monitor 100 a data signal quality level for a wireless client electronic device, wherein the data signal quality level is indicative of the level of data connectivity between the wireless client electronic device and a wireless data network. Communication process 10 may monitor 102 a cellular signal strength level for the wireless client electronic device, wherein the cellular signal strength level is indicative of the level of cellular connectivity between the wireless client electronic device and a cellular network. Communication process 10 may receive 104 a request for voice communication with the wireless client electronic device. If the cellular signal strength level is not sufficient to support the voice communication and the data signal quality level is sufficient to support the voice communication, communication process 10 may enable 106 the voice communication with the wireless client electronic device via the wireless data network.

Communication process 10s may be a server-side application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Communication process 10c may be a client-side application and may reside on and may be executed by wireless client electronic device 18. Examples of wireless client electronic device 18 may include, but are not limited to, a data-enabled, cellular telephone and a video conferencing device.

The instruction sets and subroutines of communication process 10c, which may be stored on storage device 20 coupled to wireless client electronic device 18, may be executed by one or more processors (not shown) and one or more memory architectures (not shown) incorporated into wireless client electronic device 18. Examples of storage device 20 may include but are not limited to: hard disk drives; tape drives; optical drives; RAID devices; random access memories (RAM); read-only memories (ROM), and all forms of flash memory storage devices.

Wireless client electronic device 18 may be wirelessly coupled to network 14 using a variety of methodologies. For example, wireless client electronic device 18 may be wirelessly coupled to network 14 via wireless communication channel 22 established between wireless client electronic device 18 and cellular network/bridge 24, which is shown directly coupled to network 14. Further, wireless client electronic device 18 may be wirelessly coupled to network 14 via wireless communication channel 26 established between wireless client electronic device 18 and wireless access point (i.e., WAP) 28, which is shown directly coupled to network 14.

WAP 28 may be, for example, an IEEE 802.11a, 802.11b, 802.11g, 802.11n, Wi-Fi, and/or Bluetooth device that is capable of establishing wireless communication channel 26 between wireless client electronic device 18 and WAP 28. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

User 30 may use wireless client electronic device 18 to make phone/video calls. For example, user 30 may place phone/video calls to and receive phone/video calls from user 32.

Communication process 10 may be configured to analyze the connectivity of wireless client electronic device 18 to determine the best way to handle voice calls or the voice portion of video calls (collectively referred to as voice communications). For example, when user 30 receives a voice communication to (or initiates a voice communication from) wireless client electronic device 18, communication process 10 may determine the best way to route the voice communication to wireless client electronic device 18. Communication process 10 may be configured (by default) to route voice communications to wireless client electronic device 18 via PSTN (if possible) using wireless communication channel 22 established between wireless client electronic device 18 and cellular network/bridge 24.

In the event that the voice communication cannot be routed to wireless client electronic device 18 via PSTN, communication process 10 may automatically route the voice communication to wireless client electronic device 18 via VoIP (if possible). Such a VoIP call may be made using wireless communication channel 26 established between wireless client electronic device 18 and WAP 28 or wireless communication channel 22 established between wireless client electronic device 18 and cellular network/bridge 24. Accordingly, if user 30 of wireless client electronic device 18 is at their home (which has both cellular (i.e., PSTN) connectivity and Wi-Fi (i.e., VoIP) connectivity), communication process 10 may (by default) route voice communications to wireless client electronic device 18 using PSTN. Accordingly, communication process 10 may decide how to route voice communications based, at least in part, upon cellular signal strength (i.e., PSTN signal strength) and Wi-Fi signal strength (i.e., VoIP signal strength), wherein communication process 10 may route voice communications to wireless client electronic device 18 as PSTN calls (if such a connection is available). If a PSTN connection is not available but a VoIP connection is available, communication process 10 may route voice communications to wireless client electronic device 18 as VoIP calls.

Accordingly, communication process 10 may monitor 100 a data signal quality level for wireless client electronic device 18. For example, communication process 10 may monitor 100 data signal strength level 34, which may be indicative of the level of data connectivity between wireless client electronic device 18 and a wireless data network (e.g., wireless data network 36). An example of wireless data network 36 may include but is not limited to a wifi network. Further, when communication process 10 monitors 100 the above-described data signal quality level, communication process 10 may consider various other factors. Examples of the factors that communication process 10 may consider may include but are not limited to a) latency; b) bandwidth; c) jitter; and d) packet loss.

Latency: In computer networking and computer science, latency (or packet delivery time) may be expressed as the amount of time from when the first bit of a packet leaves the transmitter until the last bit of the packet is received by the recipient. In the case of a physical link, latency may be expressed as: Transmission Time+Propagation Delay. When network connections include several physical links/forwarding nodes, the total latency may depend upon the sum of latencies of each link (and may also include packet queuing time and any processing delays).

Bandwidth: In computer networking and computer science, bandwidth may be expressed as a measurement of bit-rate of available or consumed data communication resources expressed in bits per second or multiples thereof (e.g., bits/second, kilobits/second, megabits/second, gigabits/second).

Jitter: In computer networking and computer science, jitter (or packet delay variation) may be expressed as the difference in the end-to-end one-way delay between selected packets in a data flow (with any lost packets being ignored). In other words, jitter relates to variations in the rate at which individual packets (within a data flow) travel from transmitter to recipient.

Packet Loss: In computer networking and computer science, packet loss is a manner of expressing (e.g., as a percentage or ratio) the quantity of packets that fail to reach their destination when traveling from a transmitter to a recipient through a computer network. Packet loss may be considered one of the three main error types encountered during digital communications; the other two being bit error and spurious packets due to noise.

Communication process 10 may monitor 102 a cellular signal strength level (e.g., cellular signal strength level 38) for wireless client electronic device 18. Cellular signal strength level 38 may be indicative of the level of cellular connectivity between wireless client electronic device 18 and a cellular network (e.g., cellular network 40). An example of cellular network 40 may include but is not limited to a PSTN network.

Communication process 10 may receive 104 a request (e.g., request 42) for voice communication with wireless client electronic device 18 concerning e.g., a second client electronic device (e.g., second client electronic device 44). Request 42 for voice communication may be: a) from wireless client electronic device 18 to second client electronic device 44 (e.g., wireless client electronic device 18 attempting to call second client electronic device 44); or from second client electronic device 44 to wireless client electronic device 18 (e.g., second client electronic device 44 attempting to call wireless client electronic device 18).

Examples of second client electronic device 44 may include but is not limited to a landline telephone, a video conferencing device, a cellular telephone, and a wireless telephone.

If cellular signal strength level 38 is not sufficient to support the voice communication and the data signal quality level (which, as discussed above, may consider one or more of data signal strength level 34; latency; bandwidth; jitter; and packet loss) is sufficient to support the voice communication, communication process 10 may enable 106 the voice communication with wireless client electronic device 18 via wireless data network 36. When enabling 106 the voice communication with wireless client electronic device 18 via wireless data network 36, communication process 10 may enable 108 the voice communication with wireless client electronic device 18 via wireless data network 36 using VoIP. Alternatively, communication process 10 may enable 106 the voice communication with wireless client electronic device 18 as a VoIP call via cellular network 40 (as cellular network 40 may function as a wireless data network for VoIP calls).

If cellular signal strength level 38 is sufficient to support the voice communication, communication process 10 may enable 110 the voice communication with wireless client electronic device 18 via cellular network 40. For example, communication process 10 may enable 110 PSTN voice communication with wireless client electronic device 18 via cellular network 40

Communication process 10 may be configured so that if one or more of cellular signal strength level 38 and the above-described data signal quality level change during e.g., a phone call or a video call between users 30, 32, communication process 10 may reroute the call based upon these changes. For example, if cellular signal strength level 38 becomes sufficient to support a PSTN voice communication after it was initiated as a VoIP voice communication (e.g., on wireless data network 36 or cellular network 40), communication process 10 may reroute the voice communication from VoIP to PSTN. Conversely, if cellular signal strength level 38 becomes insufficient to support a PSTN voice communication after it was initiated as a PSTN voice communication, communication process 10 may reroute the voice communication from PSTN to VoIP (e.g., on wireless data network 36 or cellular network 40).

Additionally, communication process 10 may monitor 112 one or more location-based criteria with respect to wireless client electronic device 18. Examples of such location-based criteria may include but are not limited to:

User Location Information: The location of the user (e.g., user 30) of client electronic device 18 may be considered by communication process 10 when determining whether to enable 106 voice communication via the wireless data network or enable 110 voice communication via cellular network 40. Such user location information may be determined via a GPS chipset (not shown) included within client electronic device 18. For example, if communication process 10 determines that user 30 is located at their home (which is known to have a strong wifi connection), communication process 10 may enable 106 voice communication via the wireless data network.

Wifi Network Information: Shared/global information concerning the wifi network to which client electronic device 30 is coupled may be considered by communication process 10 when determining whether to enable 106 voice communication via the wireless data network or enable 110 voice communication via cellular network 40. For example, if user 30/client electronic device 18 is coupled to a wifi network that is known (through the above-described shared/global information) to be reliable/high-quality, communication process 10 may enable 106 voice communication via the wireless data network. Conversely, if user 30/client electronic device 18 is coupled to a wifi network that is known (through the above-described shared/global information) to be unreliable/low-quality, communication process 10 may enable 110 voice communication via cellular network 40.

User Behavior Information: Information concerning the manner in which a user behaved on a particular wifi network may be considered by communication process 10 when determining whether to enable 106 voice communication via the wireless data network or enable 110 voice communication via cellular network 40. For example, if communication process 10 determines that user 30/client electronic device 18 is coupled to a wifi network that often results in the abrupt termination of voice calls when compared to PSTN-based voice calls, this may be indicative of a low-quality data connection with the above-described wifi network. Accordingly, communication process 10 may enable 110 voice communication via cellular network 40.

Accordingly, communication process 10 may utilize the above-described location-based criteria when determining whether to enable 106 voice communication via the wireless data network or enable 110 voice communication via cellular network 40.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   monitoring, by a wireless client electronic device, a data signal quality level for the wireless client electronic device prior to receiving a request for attempting a voice communication between the wireless client electronic device and a second wireless client electronic device, wherein the data signal quality level is indicative of the level of data connectivity between the wireless client electronic device and a wireless data network;
   monitoring, by the wireless client electronic device, a cellular signal strength level for the wireless client electronic device prior to receiving the request for attempting the voice communication between the wireless client electronic device and the second wireless client electronic device, wherein the cellular signal strength level is indicative of the level of cellular connectivity between the wireless client electronic device and a cellular network;
   monitoring, by the wireless client electronic device, one or more location-based criteria with respect to the wireless client electronic device prior to receiving the request for attempting the voice communication between the wireless client electronic device and the second wireless client electronic device;
   receiving, by the wireless client electronic device, the request for attempting the voice communication between the wireless client electronic device and the second wireless client electronic device; and
   in response to receiving the request for attempting the voice communication and when the monitored cellular signal strength level of the cellular network supports the request for attempting the voice communication and the monitored data signal quality level of the wireless data network supports the request for attempting the voice communication,
      enabling, by the wireless client electronic device, the voice communication between the wireless client electronic device and the second wireless client electronic device via the cellular network if the one or more location-based criteria indicate that the wireless data network experiences repeated voice call disruptions when compared to the cellular network.

2. The computer-implemented method of claim 1, wherein enabling the voice communication between the wireless client electronic device and the second wireless client electronic device via the wireless data network includes enabling the voice communication between the wireless client electronic device and the second wireless client electronic device via the wireless data network using VoIP.

3. The computer-implemented method of claim 1, when the cellular signal strength level supports the request for attempting the voice communication and the data signal quality level does not support the request for attempting the voice communication,
   enabling, by the wireless client electronic device, the voice communication between the wireless client electronic device and the second wireless client electronic device via the cellular network.

4. The computer-implemented method of claim 1, wherein the request for attempting the voice communication between the wireless client electronic device and the second wireless client electronic device is from the wireless client electronic device to the second wireless client electronic device.

5. The computer-implemented method of claim 4, wherein the request for attempting the voice communication between the wireless client electronic device and the second wireless client electronic device concerns the wireless client electronic device attempting to call the second wireless client electronic device.

6. The computer-implemented method of claim 1, wherein the request for attempting the voice communication between the wireless client electronic device and the second wireless client electronic device is from the second wireless client electronic device to the wireless client electronic device.

7. The computer-implemented method of claim 6, wherein the request for attempting the voice communication between the wireless client electronic device and the second wireless client electronic device concerns the second wireless client electronic device attempting to call the wireless client electronic device.

8. The computer-implemented method of claim 1, when the cellular signal strength level does not support the request for attempting the voice communication and the data signal quality level supports the request for attempting the voice communication,
   enabling, by the wireless client electronic device, the voice communication between the wireless client electronic device and the second wireless client electronic device via the wireless data network.

9. The computer-implemented method of claim 1, wherein when the cellular signal strength level supports the request for attempting the voice communication and the data signal quality level supports the request for attempting the voice communication,
- enabling, by the wireless client electronic device, the voice communication between the wireless client electronic device and the second wireless client electronic device via the wireless data network if the one or more location-based criteria indicate that the wireless data network is known to be reliable.

10. A computing system including a processor and memory, configured to perform operations comprising:
- monitoring a data signal quality level for a wireless client electronic device prior to receiving a request for attempting a voice communication between the wireless client electronic device and a second wireless client electronic device, wherein the data signal quality level is indicative of the level of data connectivity between the wireless client electronic device and a wireless data network;
- monitoring a cellular signal strength level for the wireless client electronic device prior to receiving the request for attempting the voice communication between the wireless client electronic device and the second wireless client electronic device, wherein the cellular signal strength level is indicative of the level of cellular connectivity between the wireless client electronic device and a cellular network;
- monitoring one or more location-based criteria with respect to the wireless client electronic device prior to receiving the request for attempting the voice communication between the wireless client electronic device and the second wireless client electronic device;
- receiving the request for attempting the voice communication between the wireless client electronic device and the second wireless client electronic device; and
- in response to receiving the request for attempting the voice communication and when the monitored cellular signal strength level of the cellular network supports the request for attempting the voice communication and the monitored data signal quality level of the wireless data network supports the request for attempting the voice communication,
  - enabling the voice communication between the wireless client electronic device and the second wireless client electronic device via the cellular network if the one or more location-based criteria indicate that the wireless data network experiences repeated voice call disruptions when compared to the cellular network.

11. The computing system of claim 10 wherein, enabling the voice communication between the wireless client electronic device and the second wireless client electronic device via the wireless data network includes enabling the voice communication between the wireless client electronic device and the second wireless client electronic device via the wireless data network using VoIP.

12. The computing system of claim 10, when the cellular signal strength level supports the request for attempting the voice communication and the data signal quality level does not support the request for attempting the voice communication,
- enabling the voice communication between the wireless client electronic device and the second wireless client electronic device via the cellular network.

13. The computing system of claim 10, wherein the request for attempting the voice communication between the wireless client electronic device and the second wireless client electronic device is from the wireless client electronic device to the second wireless client electronic device.

14. The computing system of claim 13 wherein, the request for attempting the voice communication between the wireless client electronic device and the second wireless client electronic device concerns the wireless client electronic device attempting to call the second wireless client electronic device.

15. The computing system of claim 10 wherein, the request for attempting the voice communication between the wireless client electronic device and the second wireless client electronic device is from the second wireless client electronic device to the wireless client electronic device.

16. The computing system of claim 15 wherein, the request for attempting the voice communication between the wireless client electronic device and the second wireless client electronic device concerns the second wireless client electronic device attempting to call the wireless client electronic device.

17. The computer system of claim 10, when the cellular signal strength level does not support the request for attempting the voice communication and the data signal quality level supports the request for attempting the voice communication,
- enabling the voice communication between the wireless client electronic device and the second wireless client electronic device via the wireless data network.

18. The computer system of claim 10, wherein when the cellular signal strength level supports the request for attempting the voice communication and the data signal quality level supports the request for attempting the voice communication,
- enabling the voice communication between the wireless client electronic device and the second wireless client electronic device via the wireless data network if the one or more location-based criteria indicate that the wireless data network is known to be reliable.

* * * * *